United States Patent [19]

Jainek et al.

[11] Patent Number: 5,292,432
[45] Date of Patent: Mar. 8, 1994

[54] FILTER FOR FLUIDS

[75] Inventors: Herbert Jainek, Heilbronn; Michael Wolf, Gaeufelden, both of Fed. Rep. of Germany

[73] Assignee: Filterwerk Mann & Hummel GmbH, Ludwigsburg, Fed. Rep. of Germany

[21] Appl. No.: 991,544

[22] Filed: Dec. 15, 1992

[30] Foreign Application Priority Data

Dec. 18, 1991 [DE] Fed. Rep. of Germany ....... 4141823

[51] Int. Cl.⁵ .................... B01D 35/30; B01D 27/08; F01M 11/03
[52] U.S. Cl. .................................. 210/168; 210/232; 210/238; 210/445; 210/446; 210/450; 55/502; 55/511
[58] Field of Search ............... 210/168, 232, 238, 445, 210/446, 450, 416.1, 416.5; 209/401, 402, 403; 55/511, 502

[56] References Cited

U.S. PATENT DOCUMENTS

| | | | |
|---|---|---|---|
| 190,569 | 5/1877 | Fleming | 210/446 |
| 2,192,968 | 3/1940 | Fieser | 55/511 |
| 2,584,206 | 2/1952 | Hodsdon | 210/445 |
| 2,665,009 | 1/1954 | Harstick | 210/445 |
| 2,818,178 | 12/1957 | Hodsdon | 210/445 |
| 3,076,303 | 2/1963 | Durgehoh | 55/511 |
| 3,085,689 | 4/1963 | Hering | 210/445 |
| 3,168,468 | 2/1965 | Jagdmann | 210/445 |
| 3,361,261 | 1/1968 | Fairey | 210/446 |
| 3,371,793 | 3/1968 | Fowler | 210/445 |
| 3,480,149 | 11/1969 | Housser | 210/445 |
| 3,658,183 | 4/1972 | Best | 210/446 |
| 3,698,561 | 10/1972 | Babson | 210/445 |
| 3,700,112 | 10/1972 | Maeshiba | 210/445 |
| 3,784,011 | 1/1974 | Ward | 210/445 |
| 3,980,555 | 9/1976 | Friessle | 209/399 |
| 4,088,463 | 5/1978 | Smith | 55/511 |
| 4,136,011 | 1/1979 | Joseph | 210/168 |
| 4,148,732 | 4/1979 | Burrow | 210/445 |
| 4,219,412 | 8/1980 | Hassall | 209/399 |
| 4,264,443 | 4/1981 | Anderson | 210/168 |
| 4,352,737 | 10/1982 | Tanigachi | 210/168 |
| 4,383,919 | 5/1983 | Schmidt | 209/399 |
| 4,387,023 | 6/1983 | Napier | 210/168 |
| 4,402,827 | 9/1983 | Joseph | 210/168 |
| 4,409,099 | 10/1983 | Wolff | 209/399 |
| 4,450,081 | 5/1984 | Anderson | 210/168 |
| 4,689,144 | 8/1987 | Holmes | 210/446 |
| 4,757,664 | 7/1988 | Freissle | 209/399 |
| 4,762,610 | 8/1988 | Friessle | 209/397 |
| 4,826,598 | 5/1989 | Cain | 210/445 |
| 4,828,694 | 5/1989 | Leason | 210/168 |
| 4,869,816 | 9/1989 | Markl | 209/403 |
| 4,882,044 | 11/1989 | Freissle | 209/397 |
| 4,889,621 | 12/1989 | Yamada | 210/446 |
| 4,995,971 | 2/1991 | Droste | 210/168 |
| 5,049,262 | 9/1991 | Galton | 209/399 |
| 5,049,274 | 9/1991 | Leason | 210/445 |
| 5,064,530 | 11/1991 | Duff | 210/168 |
| 5,099,954 | 3/1992 | Kikuchi | 210/168 |
| 5,112,475 | 5/1992 | Henry | 209/399 |
| 5,143,604 | 9/1992 | Bernard | 210/445 |

FOREIGN PATENT DOCUMENTS

| | | | |
|---|---|---|---|
| 241928 | 2/1960 | Austria | 210/446 |
| 2380059 | 10/1978 | France | 210/446 |
| 142943 | 5/1977 | Sweden | 209/399 |

*Primary Examiner*—Thomas M. Lithgow
*Attorney, Agent, or Firm*—Evenson, McKeown, Edwards & Lenahan

[57] ABSTRACT

A fluid filter has a housing which consists of a top housing half 10 and a bottom housing half 11. Between these two housing halves a filter element is disposed. On the bottom housing half is an inlet for the raw fluid, and on the top housing half is an outlet for the clean fluid. The two housing halves are assembled with snap fasteners.

7 Claims, 3 Drawing Sheets

FILTER FOR FLUIDS

BACKGROUND OF THE INVENTION

The invention relates to a fluid filter of the type having assembled parts and a filter disposed between such parts.

German Patent 31 23 269 discloses a filter for fluids in which the filter body is a folded sheet with a substantially rectangular outline and a housing is provided which is formed of two halves and encloses the filter body. Such filters serve for the filtration of transmission oil or fuels and are intended to achieve a high filtering action over a long period of time, in a very compact form.

In the known filter element one housing half is made of sheet metal, while the other housing half is a one-piece pressure-cast piece of fiber-reinforced polyamide. When this filter is assembled, the sheet metal is crimped onto the margin of the polyamide half, resulting in the permanent fastening together of the two housing halves.

In European Patent 03 96 385 A2 a filter for an automatic transmission is disclosed. It consists of two plastic housing parts. Between them is the filter material. The two plastic housing parts are joined together by friction welding at their peripheral surfaces.

A disadvantage in the use of friction welding is the fact that manufacturing inaccuracies impair the effect of the friction welding, i.e., there is the danger that part of the peripheral welding surface that had less than the best contact is welded imperfectly or not at all. Precisely in a filter of this kind, however, a reliable sealing of the filter element is essential, so that the vacuum prevailing in the filter will not be able to suck any air into the filter through the housing seam when the oil level is low or the vehicle is rounding a curve.

Even in the case of the filter referred to in German Patent 31 23 269 with the crimped margin there is the danger of leaks around the edges.

Another disadvantage of the known filter for fluids is to be seen in the fact that it is not possible to replace the used filter and reuse the housing.

SUMMARY OF THE INVENTION

The invention, therefore, is addressed to the problem of creating a filter for fluids which will avoid the above-described disadvantages, and in which a reliable sealing of the interior of the filter will therefore be assured, while at the same time permitting replacement of the filter element as well as the disassembly of the entire filter into its individual components.

This problem is solved by providing a filter having top and bottom housing parts, a fluid inlet and a fluid outlet disposed on the respective housing parts, a filter element disposed between the housing parts, and snap fasteners for releasably securing the housing parts together.

An important advantage of the invention is to be seen in the fact that it is now no longer necessary to discard the entire filter when the filter element is used up. The disposal of the fluid filter consisting of different materials is problematical and growing ever more difficult. It is now possible to replace the filter element and reuse the entire filter.

In one advantageous embodiment of the invention, a snap fastening is provided which consists of holes in line with one another into which pins are snapped. Known forms of these pins have tips which are pushed through the hole under spring bias and spread apart in their end position.

According to an alternative embodiment, the bores in line with one another are in the form of slots into which a catch pin provided with a cross pin is inserted. By rotating the catch pin the cross pin is moved out of the plane of the slot onto a bearing surface. This bearing surface is configured, for example, as an inclined plane and provided with a notch in which the cross pin can be fixed.

Another alternative provides for making the one housing part with catch tips and the other with catch indentations. In this embodiment no additional parts such as catch pins or the like are necessary. The two housing parts can be assembled without great effort and remain separably fastened together.

To release the catches, elements which can be operated by hand, such as holding surfaces or the like, are provided in an advantageous further development. The possibility also exists of opening these catches by means of a releasing tool. Such a tool in the case of housing halves configured with catch tips and indentations is a spreader which spreads open the catches disposed on the periphery of the housing and thus releases the two halves from one another.

In another advantageous configuration of the fluid filter the filter element is configured as a filter board which is formed into a bag such that this filter plate is first folded and the open edges are welded, cemented or stitched together. The open filter edges can also be gripped in a metal frame or clamped directly to the two housing halves.

In an additional embodiment, a sealing chamber is provided between the two housing halves and filled with a sealant, especially silicone, the filter element reaching into this sealing chamber and foaming the silicone after the two housing halves are assembled, thus sealing the filter element.

In a further development of this embodiment, this sealant also serves as a gasket between the two housing halves and/or as a means for binding together the two housing parts.

An advantageous further development of the filter element is to foam or spray a gasket around it and to cause this gasket to be held in a groove between the two housing halves.

For ease in replacing the filter element in the fluid filter and to provide better sealing of the opening through which the raw fluid enters it, the filter element can be provided with a rubber sealing gasket in the entrance area. This rubber seal is configured so that it can be buttoned into the inlet opening of the corresponding housing half.

These and other features of the preferred further developments of the invention will be found not only in the claims but also in the description and drawings, the individual features being able to be carried out singly or plurally in the form of subcombinations in the embodiment of the invention and in other fields of endeavor, and may be advantageous as well as independently patentable constructions for which protection is herein claimed.

Embodiments of the invention are represented in the drawings and are explained hereinbelow.

BRIEF DESCRIPTION OF THE APPLICATION DRAWINGS

FIG. 3b is a bottom plan view of the fastener of FIG. 3a;

DETAILED DESCRIPTION OF THE PREFERRED EMBODIMENTS

Figure 1:
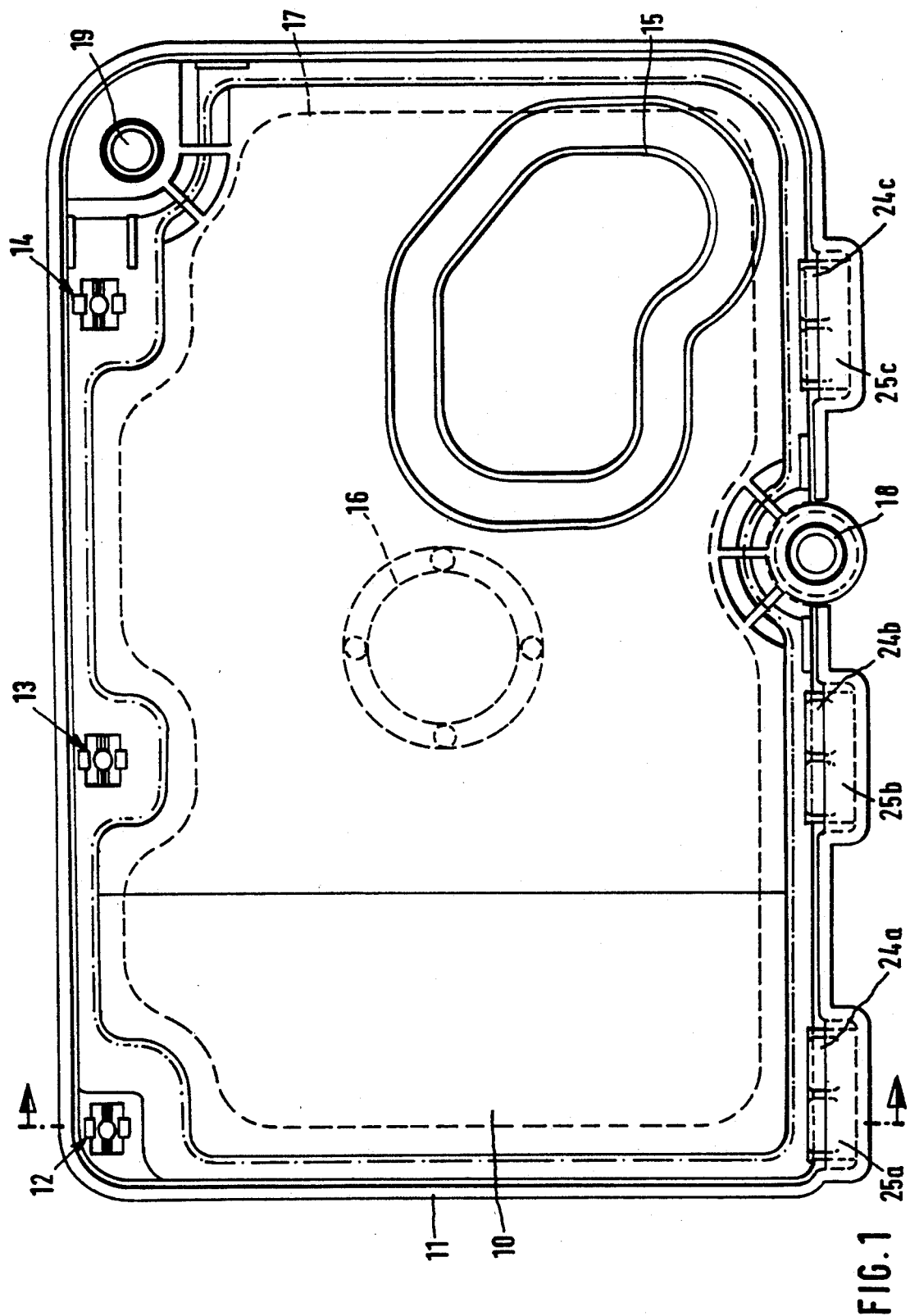
FIG. 1 is a plan view of the fluid filter.

The fluid filter according to FIG. 1 consists of a bipartite housing. The bottom half 10 of the housing is assembled to the upper half 11, seen only at the outer edge in this drawing, by means of snap fasteners 12, 13 and 14. These snap fasteners can be installed automatically. The bottom housing part 10 has an outlet opening 15.

Between the two housing parts is a flat filter element 17. The upper part of the housing is provided with two fastening eyes 18 and 19 by which the fluid filter can be screwed onto a support.

Figure 2:
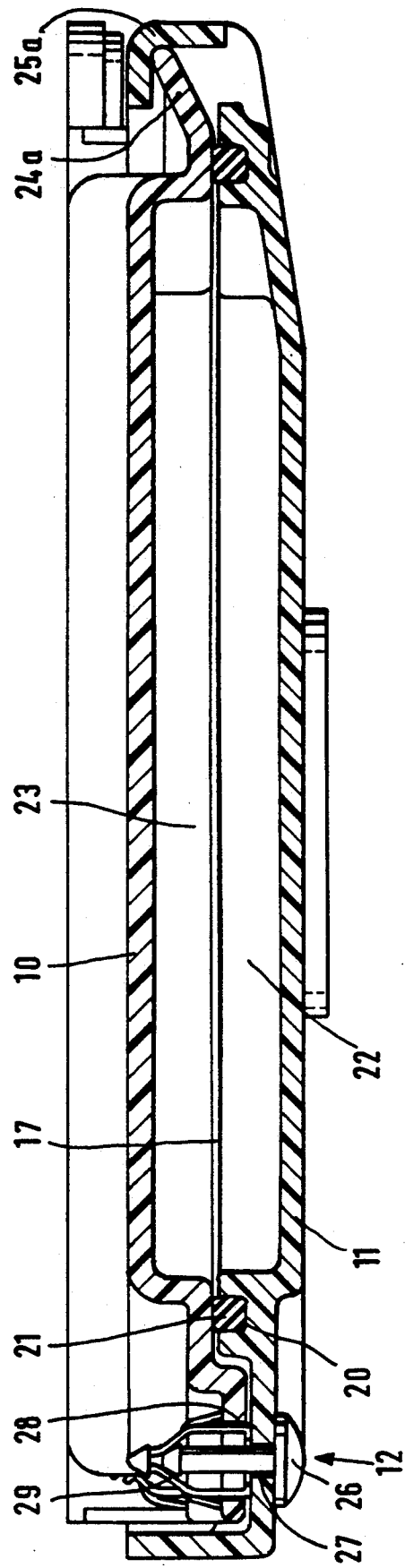
FIG. 2 is a section through the filter shown in FIG. 1, looking in the direction of the arrows in that Figure.

In the cross section according to FIG. 2 it can be seen that the upper housing part 11 has a circumferential groove 20 into which a sealing ring 21 is inserted.

The bottom housing part 10 is provided with three lugs 24 a, b, c. These extend into recesses 25 a, b, c in the upper housing part 11 and fasten the two housing parts together on one side. On the opposite side the housing halves are provided with the snap fasteners 12, 13 and 14. These snap fasteners consist each of a pin 26 having catch notches. This pin is passed through a bore 27 in the upper housing half and a bore 28 of the bottom housing half and then a spreader 29 is placed on the pin. This spreader closes the two housing halves 10 and 11, and in conjunction with the opposite catch notches of the pin, a reliable and tight filter unit is created.

Figure 3B:
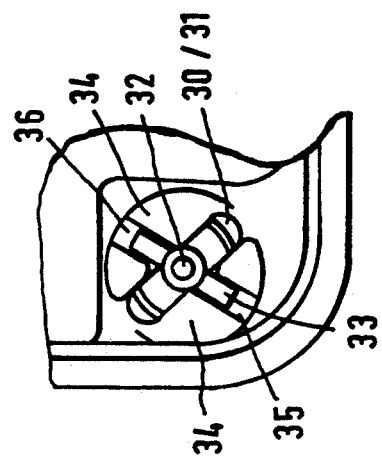
Figure 3A:
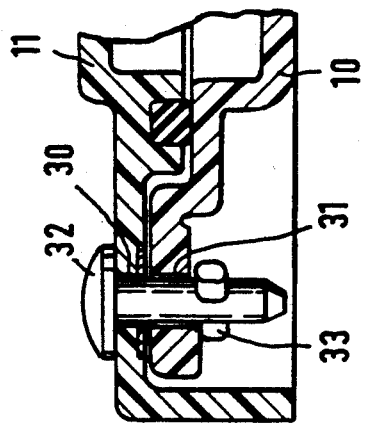
FIG. 3a is a fragmentary section showing in more detail the configuration of a fastener.

An alternative configuration to the pin 26 and spreader 29 is shown in FIGS. 3a and 3b. The bore 30 in the upper housing half 11 and the bore 31 in the bottom half 10 are configured as slots. Through these a pin 32 having a cross pin 33 is passed. On the bearing surface 34 of the housing half 11 an inclined plane is created. By a quarter rotation of the pin 32 the cross pin 33 slides on this inclined plane and catches in the recesses 35 and 36. This fastening thus creates a reliable as well as secure sealing of the two housing parts 10 and 11. By a quarter turn of the pin the pin can be moved back to the open position and the two housing parts can be separated from one another.

Figure 4:
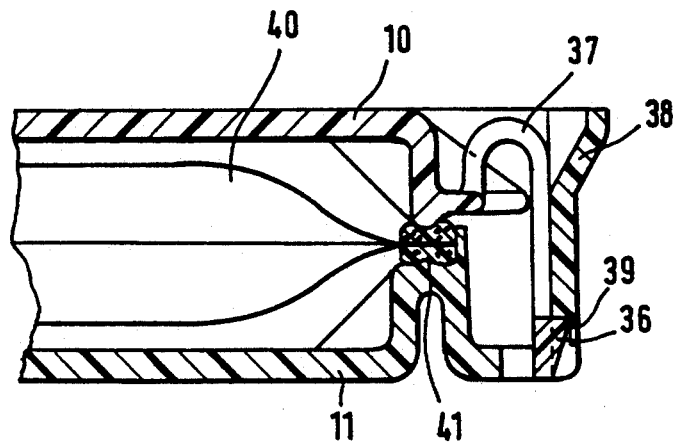
FIG. 4 is a fragmentary section showing the configuration of a gasket.

FIG. 4 shows a snap fastening for the two housing halves 10 and 11 without additional fastening means. The housing half 10 is provided with a catch projection 36 which is disposed on a spring loop 37 of the housing half 10. When the two housing parts 10 and 11 are put together this catch projection slides along the guiding surface 38 of the housing half 11 and in the end position snaps into a recess 39 disposed on the guide surface.

In FIG. 4 the filter element is configured as a bag filter 40. This bag filter is gripped at its circumferential margins in a sealing means 41. The purpose of this sealing means is on the one hand to close the bag filter 40 at its periphery and on the other hand to seal the surface of contact between the two housing parts 10 and 11.

Figure 5:
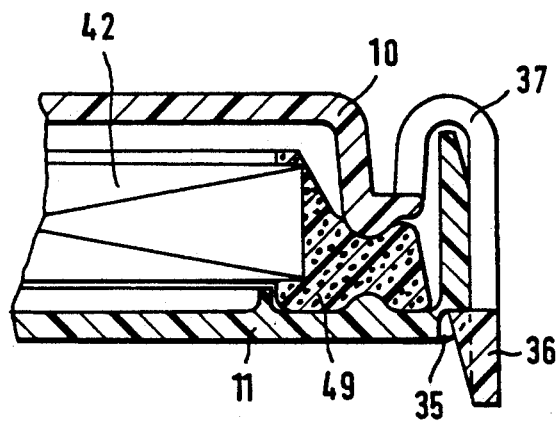
FIG. 5 is a fragmentary section of an alternative configuration of a gasket.

FIG. 5 shows a flat, accordion-pleated filter element 42. This filter element is provided with a peripheral foam molding 49 consisting, for example, of polyurethane (PUR) foam. This molding is engaged in the contact area between the two housing halves 10 and 11. This produces a sealing-off of the interior of the fluid filter from the outside. In the example represented, the housing half 10 is provided with a catch projection 36 which is snapped into a recess 35 in the bottom housing half 11. The two housing halves are separated from one another manually, for example, by releasing the projections 36 from the recesses against the action of spring 37. Of course, it is also possible to separate them with a tool, the tool being able to release several snap fasteners at once.

Figure 6:
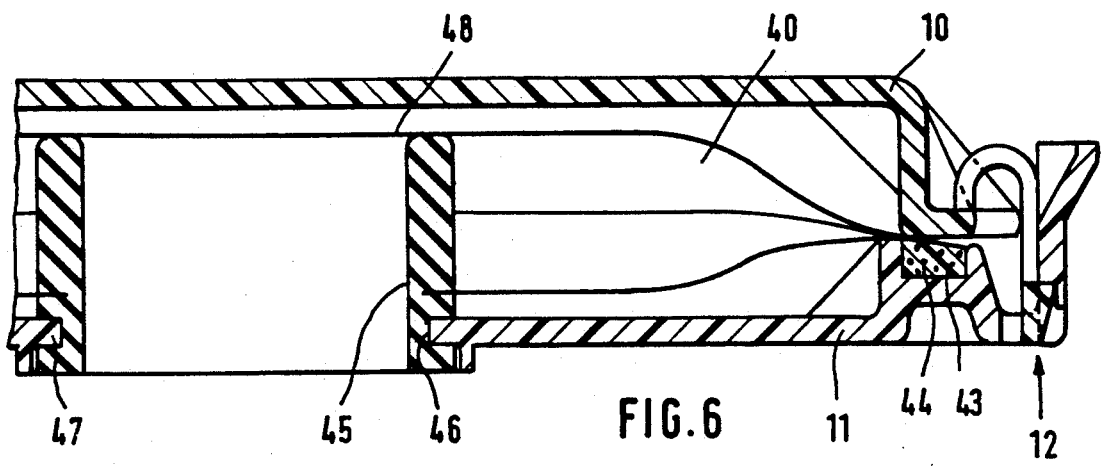
FIG. 6 is a fragmentary section through a fluid filter with a snap fastening.

The fluid filter according to FIG. 6 similarly has an upper housing half 10 and a bottom half 11, and also has a snap fastening 12 which does not require additional fastening elements. In this figure too the filter element consists of a bag filter 40 whose peripheral margin extends into a sealing chamber 43. Before the two housing halves 10 and 11 are put together a sealant is placed in this sealing chamber which has the property of foaming and filling up the entire chamber. Such a sealant 44 is, for example, a foamable silicone or PUR. The foaming produces the seal between the two housing halves 10 and 11 and the margin of the bag filter 40 is effectively sealed.

The raw fluid inlet of the bag filter is provided with a rubber gasket 45. This gasket has a groove 46. The edge 47 of the inlet opening 16 of the housing half 11 engages in this groove. While the rubber gasket 45 is fixedly joined to the bag filter 40, this rubber gasket is only buttoned into the margin 47. It is thus possible after removing the housing half 10 to remove the bag filter and install a new bag filter having a new rubber gasket 45 in the filter chamber.

The rubber gasket extends into the bag filter 40 and serves simultaneously as a spacer for the upper filter surface 48.

We claim:

1. A fluid filter comprising:
   top and bottom housing parts,
   a raw fluid inlet disposed on one of said parts and an outlet disposed on the other of said parts,
   a filter element disposed within and between said housing parts,
   peripheral sealing means positioned between said housing parts for sealing the same when assembled, and
   fastener means for releasably secure said housing parts together,
   wherein said filter element is configured as a bag and said top and bottom housing parts are provided at the circumferential sealing margins thereof with bores, said bores being aligned with one another, and said fastener means consist of catch pins inserted into the bores for removably assembling said parts,
   wherein said aligned bores are configured as elongated holes and at least one said catch pin has a cross pin adapted to be inserted into said elongated holes and at least one of said top and bottom parts has a inclined plane means with a recess, adjacent the bore in said at least one of said top and bottom housing parts for releasable securing said cross pin after being inserted through the aligned bore said catch pin is rotated by a quarter turn to disalign the cross pin with the elongated hole and move the cross pin up the inclined plane means and into the recess to thereby secure said housing parts together, the catch pin being rotatable to an open position to allow separation of the housing parts.

2. A fluid filter according to claim 1, wherein said filter element consists of at least one filter plate which is folded bag-like to form a filter pocket which is closed at open peripheral sides thereof by means of welding, gluing or stitching.

3. A fluid filter according to claim 1, wherein said filter element consists of at least one filter plate which is folded to a bag and the open peripheral edges are provided with a metal frame or are clamped by said housing parts when assembled.

4. A fluid filter according to claim 1, wherein said filter element extends at its margin into a sealing chamber which is sealed with a silicone sealant.

5. A fluid filter according to claim 8, wherein said silicone sealant comprises a foamed silicone which seals the housing interior from the housing exterior between said housing parts.

6. A fluid filter according to claim 1, wherein said filter element is provided at its peripheral edge with a foamed or molded gasket said housing parts defining a circumferential sealing groove into which said gasket extends.

7. A fluid filter according to claim 1, wherein said fluid filter inlet of said filter element being provided with a collar-like rubber seal adapted to engage said raw fluid inlet of one of said housing parts.

* * * * *